Figure 1:
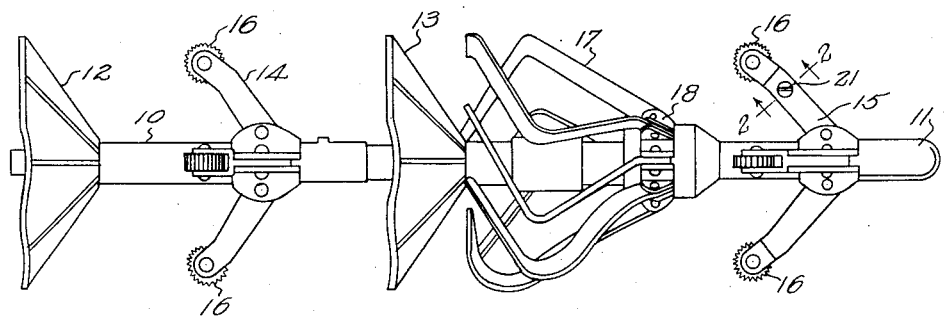

March 13, 1928.

A. LOWY 1,662,429

PROCESS OF AND APPARATUS FOR LOCATING OBSTRUCTIONS IN PIPE
LINES CARRYING FLUIDS
Filed April 18, 1925

Inventor
Alexander Lowy

Patented Mar. 13, 1928.

1,662,429

UNITED STATES PATENT OFFICE.

ALEXANDER LOWY, OF PITTSBURGH, PENNSYLVANIA.

PROCESS OF AND APPARATUS FOR LOCATING OBSTRUCTIONS IN PIPE LINES CARRYING FLUIDS.

Application filed April 18, 1925. Serial No. 24,295.

The invention relates to locating obstructions in pipe-lines carrying fluids. Commercial pipe-lines conveying liquids, such as oil lines, tend to become obstructed from depositing-out sediment and extraneous matter of various kinds, especially when there is a reduction in temperature in the line. Likewise in pipe lines conveying gases, liquids and solids may be deposited, causing a blockage to the free flow of the gas. A locating tool known as a "go devil" is used to clean out such pipe-lines.

In some industries, oil lines for example, where sediment gradually deposits or refuse collects, a tool is forced through the pipeline from time to time to scrape the inner surface of the pipe and remove such deposits before a serious or total obstruction is produced. The so-called "go devil" is a good example of such a device.

The "go devil," however, encounters considerable resistance and quite frequently gets stuck in the pipe-lines and becomes a considerable obstruction in same.

Although it is of the utmost importance to be able to locate such a tool with the least delay and expense, prior to my invention, there has not yet been devised a simple, sure and inexpensive method for locating the obstruction.

It has been the practice prior to my invention to send a field man or field men along the pipe line to keep track of the "go devil" by listening to the sound that it makes in its travel through the line. As often as not, the field man fails to follow the sound and so loses track of the device. An additional device may then be sent into the line and two or more men may then be sent along, one assisting the other and following the second device through the line. Even with such expensive methods, operators have failed to keep track of the device in its passage through the pipe-line and thus have failed to locate the obstruction.

Furthermore, the difficulties of locating obstructions in a pipe-line are very much enhanced when the line is deep in the ground, passes through walls, under streams of water, or, for any other reason, is difficult to reach.

The use of a stethoscope is often resorted to for keeping track of the sound as the device is passing through.

It will be observed that all these maneuvers require the constant attention of the men hunting for the sound, and the search must be continuous, for if the party fails to know with certainty just when the device in the line has been stopped by the obstruction, he cannot tell whether the obstruction has been reached, or whether he has merely lost the sound of the device passing through the line.

It is evident that such a method is not only very costly but is very limited in its use, since the search for the device and the passage of the device through the line must synchronize too nearly.

The "go devil", or similar devices could have as part of their mechanism a device that would continue to rattle, or in other ways give off its sound for some time after it is stopped by the obstruction in the line. This method would still make it difficult to hear the sound, especially if the device is lodged in a pipe-line well under ground, or behind walls, or in other ways inaccessible. The means for detecting the source of the sound could be very much improved by the use of a double sound box, stethoscope, such as is used to locate entombed coal miners, or as was used during the War to locate the sound of under-ground operations. But even the above combinations of all the schemes mentioned are comparatively crude and cumbersome and tie up the lines for too long a time.

My invention obviates the difficulties mentioned in a manner as will now be described:

One way of carrying out my invention is to put some radioactive substance in a receptacle into the line and to send it along the line until its travel is arrested by coming in contact with the obstruction. The field man with an electroscope can then go along the path of the pipe line and locate the position of the obstruction in the line.

Another way of carrying out my invention is to attach a radio-active substance to the tool that is being sent through the line for purposes of cleaning same and if for any reason said tool does not pass through the line but becomes stuck, a field man with an electroscope can then go along the route of the pipe-line and locate the position of the tool in the line. It is often very useful to follow the tools in the line, in which case by the use of a series of charged electroscopes placed at intervals along the route of the pipe-line, the field man can determine the location of the tool between any two electroscopes.

Figure 2:
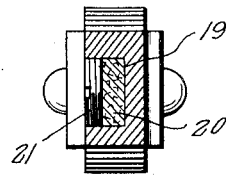

To attain these objects and such further objects as may appear herein or be hereinafter pointed out, I make reference to the accompanying drawing forming a part hereof, in which Figure 1 is a plan view illustrating my device;

Figure 2 is a section taken on a line 2—2 of Figure 1.

Making reference to the drawing it will be observed that I have shown my invention, by way of illustration, in combination with a scraper tool, known as a "go-devil," which comprises generally a shaft 10, having at its forward portion the nose 11. Pairs of impelling veins 12 and 13 are provided intermediate the length thereof. Disposed between the impelling veins 12 and 13 and the frontal portion, I provide the group of centering arms 14 and 15, having at their terminals knurled wheels 16. Propeller and scraper members 17 are held by the collar 18.

In one of the centering arms I provide a chamber 19 in which I dispose a quantity of radio-active substance 20, held against displacement by the screw member 21. The "go-devil" thus described operates in its normal way so far as the propelling veins serve to carry the entire tool by the flow of liquid. The propeller member 17 serves to whirl and turn the tool during its progress in the line, the terminals thereof serving at the same time to scrape the walls of the pipe line. The members 14 and 15, with their knurled wheels 16, will serve to center the tool, at the same time scraping the sides thereof of any sediment.

It will be appreciated that a tool like a "go devil" with a bit of radio-active substance attached to it will become very much more useful, for, when one is certain of being able to locate the tool it could be used more often without waiting for too much sediment to collect in the line before the tool is used to clean out same. Furthermore, a field man is not needed to follow the tool until it is actually stuck, for, in the carrying out of my invention a field man with an electroscope could very readily locate the tool.

In the use of an electroscope to detect the radium emanation issuing from the radio-active substance in the pipe-line, same can be detected by either using a charged electroscope and noting the effect of the emanations on it, or, by noting the effect of the emanations on a discharge electroscope.

In carrying out the invention I do not wish to limit it to the use of an electroscope to detect the radium emanation given out by the radio-active substance in the pipe-lines.

In case a tool such as a "go devil" is used in the pipe line without having any radio-active substance attached to same, and should the "go devil" fail to pass through the line, another "go devil" to which a piece of radio-active substance is attached, could be sent through the line for the purpose of either forcing the first "go devil" through, or, if the obstruction is too great, then the second "go devil" could very easily be located by any of the means generally employed to detect the presence of the radio-active substance. The above are but a few examples of the usefulness of the invention and methods of carrying out same as applied to the oil field.

In chemical works where one must send fluids of all kinds through pipe-lines, and encounter obstructions due to deposits of sediment, or formation of frost, or other changes from liquid to solid phases, my invention is of inestimable value in locating the exact position of the obstruction with the least delay and expense.

The above invention refers to all types of pipe-lines, conduits, etc., conveying liquids or gases.

Having described the invention, I wish to claim the following without in any way limiting said claim to the particular applications of the invention herein enumerated or suggested:

1. For use with a radium emanation detector, an apparatus consisting of a tool adapted to be used within a pipe line and including a radio-active substance adapted to activate said detector.

2. A method of locating obstructions in pipe lines which comprises sending a mechanical device through the pipe line and accompanying a radio-active substance therewith and then detecting the location of the radio active substance by the radium emanations thereof.

3. A method of locating obstructions in pipe lines which comprises sending a radio-active substance along the pipe line so mounted as to be carried by the flow of material therein and then detecting the location of the radio-active substance by the radium emanations thereof.

4. A method of locating obstructions in pipe lines which comprises moving a scraper through the pipe line accompanied by a radio-active substance and then determining the relative position of the scraper and radio-active substance by the radium emanations thereof.

5. A method of locating obstructions in pipe lines which comprises moving a scraper through the pipe line and accompanying a radio-active substance therewith and then moving a device responsive to radium emanations along said line, outside thereof, to determine the relative position of the radio-active substance within the pipe line.

6. A method of locating obstructions in pipe lines which comprises sending a radio-active substance so mounted as to be carried by the flow of the material in the line and moving the same through the line until the obstruction is encountered and then submitting a radium emanation detector approximate to the line to determine the relative position of the radio-active substance within said line.

7. A method of locating obstructions in pipe lines which comprises sending a radio-active substance so mounted as to be carried by the flow of the material in the line and moving the same through the line until the obstruction is encountered and then locating the relative position of the radio-active substance within the line by detecting its radiations outside the line.

8. A method of locating obstructions in pipe lines which comprises moving a receptacle having nearly the same diameter as the inside of the pipe along the length thereof and accompanying a radio-active substance therewith and noting the relative position of the radio-active substance by recording the emanations thereof outside the line.

9. A method of locating obstructions in pipe lines which comprises moving a radio-active substance inside of the pipe along the length thereof and noting the relative position and movement of the radio-active substance by recording the emanations thereof outside the line.

10. A "go devil" which has attached thereto a radio-active substance in quantities sufficient so that when the apparatus is used within a pipe line, the emanations of the radio-active substance may be detected outside the pipe line.

11. A "go devil" which has attached thereto a radio-active substance adapted to actuate an electroscope when said "go devil" is put in use inside a line.

12. A scraping tool designed to be used on the inside of a pipe line and a radio active substance attached thereto, the combination being adapted for detecting the relative position of the tool when in use, by the radium emanations thereof.

13. A pipe line scraper having a quantity of radio-active substance attached thereto, adapted for locating obstructions in pipe lines.

Signed at Pittsburgh, in the county of Allegheny and State of Pennsylvania, this 24th day of December, A. D. 1924.

ALEXANDER LOWY.